(12) United States Patent
Choi et al.

(10) Patent No.: US 11,150,743 B2
(45) Date of Patent: Oct. 19, 2021

(54) ELECTRONIC DEVICE AND METHOD FOR INTELLIGENT INTERACTION THEREOF

(71) Applicant: Samsung Electronics Co., Ltd., Gyeonggi-do (KR)

(72) Inventors: Seunghwan Choi, Gyeonggi-do (KR); Hyunjin Kim, Gyeonggi-do (KR); Jonghyun Ryu, Gyeonggi-do (KR); Jaeyoung Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/671,452

(22) Filed: Nov. 1, 2019

(65) Prior Publication Data

US 2020/0142505 A1 May 7, 2020

(30) Foreign Application Priority Data

Nov. 1, 2018 (KR) .................. 10-2018-0133007

(51) Int. Cl.
*G06F 3/03* (2006.01)
*G08C 21/00* (2006.01)
*H04Q 9/02* (2006.01)

(52) U.S. Cl.
CPC .............. *G06F 3/03* (2013.01); *G08C 21/00* (2013.01); *H04Q 9/02* (2013.01); *G08C 2201/91* (2013.01)

(58) Field of Classification Search
CPC ... G06F 3/03; G08C 2201/91; G08C 2201/93; H04Q 9/02; H04Q 2209/883

(Continued)

(56) References Cited

U.S. PATENT DOCUMENTS 6,111,580 A    8/2000    Kazama et al.
2012/0268580 A1   10/2012   Kim et al.
(Continued)

FOREIGN PATENT DOCUMENTS

KR    10-2012-0116134 A    10/2012
KR    10-2016-0022329 A    2/2016
(Continued)

OTHER PUBLICATIONS

Vaufreydaz, Dominique, "Starting engagement detection towards a companion robot using multimodal festure", https://arxiv.org/abs/1503.03732.

(Continued)

*Primary Examiner* — Vernal U Brown
(74) *Attorney, Agent, or Firm* — Cha & Reiter, LLC

(57) ABSTRACT

An electronic device and method are disclosed. The electronic device includes a memory, sensors and a processor. The processor may implement the method, including detecting, by one or more sensors, first sensing information related to a user action, determining, by at least one processor, specific information corresponding to the first sensing information based on the first sensing information being a first type of sensing information, detecting, by the one or more sensors, second sensing information related to the user action, and executing a second function related to a first function, the second function corresponding to the specific information and the second sensing information, based on the second sensing information being a second type of sensing information for performing the first function.

18 Claims, 10 Drawing Sheets

(58) Field of Classification Search
USPC .......................................................... 340/10.5
See application file for complete search history.

(56) References Cited

U.S. PATENT DOCUMENTS

| | | |
|---|---|---|
| 2015/0032260 A1 | 1/2015 | Yoon et al. |
| 2015/0185850 A1 | 7/2015 | Guilak et al. |
| 2015/0185858 A1 | 7/2015 | Nagara |
| 2016/0366203 A1* | 12/2016 | Blong ..................... H04L 51/32 |
| 2019/0027138 A1* | 1/2019 | Wang .................. G10L 15/1815 |
| 2019/0311718 A1* | 10/2019 | Huber ................... G06F 1/3231 |

FOREIGN PATENT DOCUMENTS

| | | |
|---|---|---|
| KR | 10-2016-0033502 A | 3/2016 |
| WO | 2013/096023 A1 | 6/2013 |
| WO | 2017/116921 A1 | 7/2017 |

OTHER PUBLICATIONS

International Search Report dated Feb. 13, 2020.

\* cited by examiner

| voice | position/distance | moving/approaching speed | direction | angular speed | orientation | hand motion |
|---|---|---|---|---|---|---|
| spoken | close | stop | toward device | stop | walking | pointing |
| spoken | far | slow | etc. | slow | running | waving |
| not spoken | in-range | ... |  | ... | stand up | etc. |
| not spoken | out of range | fast |  | fast | seat down |  |
|  |  |  |  |  | lie down |  |

FIG.9A

| voice | position/distance | moving/approaching speed | direction | angular speed | orientation | hand motion | perform function and represent |
|---|---|---|---|---|---|---|---|
| not spoken | in-range | far | toward device | fast | running | pointing | Quick wake-up |
| spoken | in-range | slow | toward device | slow | walking | etc. | Welcome & wake-up |
| not spoken | close | stop | etc. | stop | stand up | etc. | Welcome & briefing |
| spoken | far | slow | etc. | slow | walking | etc. | Quick briefing |

FIG.9B

| # | user action/context | unintentional user action information → interest level ||| determine user's intent | feedback | perform function |
|---|---|---|---|---|---|---|---|
| | | moving speed | angular speed | variation in device interest level | gaze | | |
| ① | slowly moves around device | slow | slow | low interest level (0.3 or less) | etc. | light reacts, turning down | none |
| ② | eye meeting in context (1) | slow | slow | low interest level (0.3 or less) | toward device | light reacts, turning down | none |
| ③ | moves around device at moderate speed | mid | slow | medium interest level (0.7) | etc. | light reacts, turning up | none |
| ④ | eye meeting in context (3) | mid | mid | medium interest level (0.7) | toward device | Wake-up/Listening | Wake-up → say "Hi" → stand by in listening state |
| ⑤ | user makes command/ inquiry while keeping on moving in context (4) | mid | mid | medium interest level (0.7) | etc. | listening/processing/speaking | answer at moderate speed |
| ⑥ | quickly moves around device | fast | mid | high interest level (1.0) | etc. | light reacts, turning more up | none |
| ⑦ | eye meeting in context (6) | fast | fast | high interest level (1.0) | toward device | Wake-up/Listening | Wake-up → stand by in listening state |
| ⑧ | makes command/ inquiry while keeping on moving in context (7) | mid | mid | high interest level (1.0) | etc. | listening/processing/speaking | answer at high speed |

FIG.9C

ELECTRONIC DEVICE AND METHOD FOR INTELLIGENT INTERACTION THEREOF

CROSS-REFERENCE TO RELATED APPLICATION(S)

This application is based on and claims priority under 35 U.S.C. 119 to Korean Patent Application No. 10-2018-0133007, filed on Nov. 1, 2018, in the Korean Intellectual Property Office, the disclosure of which is herein incorporated by reference in its entirety.

TECHNICAL FIELD

Certain embodiments of the disclosure relate to electronic devices and methods of intelligent interaction of the same.

DESCRIPTION OF RELATED ART

Electronic devices capable of intelligent interaction are recently used in various sectors (e.g., artificial intelligence, Internet of things "IoT", smart home, mobility, cloud computing, security, energy, home appliances, etc.).

To that end, electronic devices may communicatively connect to a network and provide intelligent interaction for intercommunication between people, other electronic devices, and/or communication networks.

To implement intelligent interaction, an electronic device may monitor user activity. When a specific action is detected pre-associated with a specific function, the device may perform the function. The specific function may be triggered responsive to detecting the user's specific action. For example, when a user approaches a smart speaker device as to be within a predetermined distance of the smart speaker, the speaker device may detect the user's approach and initiate playback of music.

In light of the desires for smooth and easy user experience (UX), the user actions information may be detectable accounting for with variability in the actions, as compared with other user consistent and more easily replicatable inputs (e.g., button, touch, or voice-based commands). Although the user's action is predefined as to correspond to the specific function, it may be hard for the user to always execute the same action. In order to address this issue, some solutions interpret all actions having sufficient similarity to indicate the predefined specific action.

Accordingly, negligible differences in the user's input action may be disregarded, and the electronic device may simply react to the general action and perform the same function. This solution does present issues. For example, always performing the same function in the same representation may be monotonous. Further, sometimes the user executes an action intending to request the specific function, but a tiny difference in action may cause the electronic device to respond incorrectly (e.g., by executing an incorrect function). As a result, the electronic device may react incorrectly because of confusion over similar user input actions (e.g., similar pronunciations or gestures). The user may also have difficulty learning to produce the accurate actions (e.g., designated wake-up words and/or gestures) and may struggle to reproduce the precise actions. In the case, that a continuous action is needed to perform the specific function, if the continuous action stops, cancellation may be difficult.

The above information is presented as background information to assist with an understanding of the disclosure. No determination has been made, and no assertion is made, as to whether any of the above might be applicable as prior art with regard to the disclosure.

SUMMARY

According to an embodiment, there may be provided an electronic device and a method of intelligent interaction thereof, which may secure a diversity of function representations.

According to an embodiment, there may be provided an electronic device and a method of intelligent interaction thereof, which may perform various functions.

According to an embodiment, there may be provided an electronic device and a method of intelligent interaction thereof, which may perform a customized function suited for the user's context.

According to an embodiment, there may be provided an electronic device and a method of intelligent interaction thereof, which may precisely grasp the user's intent and lower the probability of malfunction which may occur when the user's intent is grasped.

According to an embodiment, there may be provided an electronic device and a method of intelligent interaction thereof, which may eliminate the need for the user to learn correct actions (e.g., wake-up words or gestures).

In accordance with certain embodiments, an electronic device may include a memory storing a first and second function; one or more sensors; and a processor operatively connected with the memory and the one or more sensors, wherein the memory stores instructions executable by the processor to cause the electronic device to: detect, by the one or more sensors, first sensing information related to a user action, determine specific information corresponding to the first sensing information based on the first sensing information being a first type of sensing information, detect, by the one or more sensors, second sensing information related to the user action, and perform the second function related to the first function, the second function corresponding to the specific information and the second sensing information, based on the second sensing information being a second type of sensing information for performing the first function.

In accordance with certain embodiments, an electronic device may include a memory, one or more sensors, and a processor operatively connected with the memory, wherein the memory stores instructions executable by the processor to cause the electronic device to: detect, by the one or more sensors, sensing information related to a user action, determine specific information corresponding to the detected sensing information based on the detected sensing information being a first type of sensing information, execute a first function based on the determined specific information, and execute a second function corresponding to the sensing information, based on the sensing information being a second type of sensing information.

In accordance with certain embodiments, a method of intelligent interaction of an electronic device includes: detecting, by one or more sensors, first sensing information related to a user action, determining, by at least one processor, specific information corresponding to the first sensing information based on the first sensing information being a first type of sensing information, detecting, by the one or more sensors, second sensing information related to the user action, and executing a second function related to a first function, the second function corresponding to the specific information and the second sensing information, based on the second sensing information being a second type of sensing information for performing the first function.

Other aspects, advantages, and salient features of the disclosure will become apparent to those skilled in the art from the following detailed description, which, taken in conjunction with the annexed drawings, discloses example embodiments of the disclosure.

BRIEF DESCRIPTION OF THE DRAWINGS

A more complete appreciation of the disclosure and many of the attendant aspects thereof will be readily obtained as the same becomes better understood by reference to the following detailed description when considered in connection with the accompanying drawings, wherein:

FIG. 9A is a table illustrating an example of user action information according to an example embodiment;

FIG. 9B is a table illustrating various example function representations according to an example embodiment;

FIG. 9C is a table illustrating example combinations of user action information and function representations according to an example embodiment.

Throughout the drawings, like reference numerals will be understood to refer to like parts, components, and structures.

DETAILED DESCRIPTION

Figure 1:
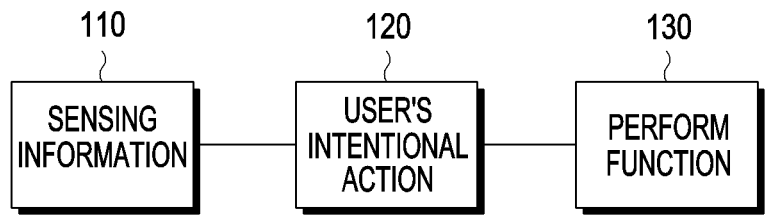
FIG. 1 is a view illustrating the concept of intelligent interaction according to an example embodiment.

Hereinafter, embodiments of the disclosure are described with reference to the accompanying drawings.

The terms as used herein may be defined as follows.

"Sensing information" may be sensing information related to the user's action (motion). The sensing information may be various types of information created in response to the user's action. The sensing information may be obtained by at least one sensor (e.g., a motion sensor or camera image sensor) for sensing the user's action. The sensing information may be classified into a first type of sensing information and a second type of sensing information.

"First type of sensing information" may be sensing information related to the user's unintentional action. The first type of sensing information may be sensing information related to the user's non-trigger action. The first type of sensing information may be relative (indirect) sensing information utilized for determining the user's intent. In other words, the "unintentional actions" may be any user actions which are not prestored in the electronic device, and lack association with a designation function or functions executable by the electronic device.

"Second type of sensing information" may be sensing information related to the user's intentional action. The second type of sensing information may be sensing information related to trigger actions. The second type of sensing information may be absolute (direct) sensing information utilized for determining the user's intent. In other words, the "intentional actions" may be any user actions which are prestored (e.g., predefined) in the electronic device, and are pre-associated with a designated function or functions executable by the electronic device.

For example, the first type of sensing information (e.g., a user speed) may be obtained by a first sensor (e.g., a speed sensor or camera image sensor). The second type of sensing information (e.g., position) may be obtained by a second sensor (e.g., a position sensor or camera image sensor). As another example, the first type of sensing information (e.g., speed) may be information resulting from performing processing or computation on the second type of sensing information (e.g., change in position). As another example, at least one of the first type of sensing information (e.g., the user's approaching speed) or the second type of sensing information (e.g., the user's position) may be obtained based on sensing information (e.g., an image obtained by the camera image sensor) obtained by one sensor.

The user's "intentional action" may be an action intended by a user to result in execution of a specific function. The intentional action may be a direct action for performing the specific function. The intentional action may be a trigger that triggers the specific function. The specific function may be set to correspond to (e.g., match) a specific intentional action. As the specific intentional action is recognized, the specific function may automatically be performed.

The user's "unintentional action" may be differentiated from the intentional action. The unintentional action may be an action that the user did not intend to result in execution of the specific function. The unintentional action may be a non-trigger action that does not intentionally trigger the specific function. For example, the unintentional action may be an unconscious action by the user. As another example, the unintentional action may be a related to the intentional action which occurs before it, as preparation to execute the intentional action, or an action performed while waiting to execute the intentional contact. In another example, the unintentional action may not correspond to or match the specific function. In another example, the unintentional action may be an action that matches no predesignated function.

"User action information" may be at least one of information about the user's action, information related to the user's action, sensing information related to the user's action, or user-related information extracted from sensing information.

"Intentional action information" may be at least one of information about the user's intentional action, information related to the user's intentional action, sensing information related to the user's intentional action, or user-related information extracted from the sensing information or second type of sensing information.

"Unintentional action information" may be at least one of information about the user's unintentional action, information related to the user's unintentional action, sensing information related to the user's unintentional action, or user-related information extracted from the sensing information or first type of sensing information.

"Specific information" may be information identifiable based on the sensing information related to the user's action. "Specific information" may be information identifiable based on the sensing information related to the user's unintentional action. According to an embodiment, the specific information may be interpreted as an interest level. However, the specific information is not limited thereto but may rather be applicable, modified, or expanded to other types of information which may be extracted, yielded, or identified from sensing information related to the user's action.

"Interest level" or "interest rate" may be the degree of interest that the electronic device has in the user. The interest level may be determined based on at least one piece of sensing information related to the user's action. The interest level may be determined based on at least one piece of first-type sensing information related to the user's unintentional action. For example, the interest level may be set in incremental levels (e.g., 1, 2, 3, 4, 5 . . . n) which are each respectively mapped to a type and value of sensing information. For example, different possibly user velocities (whether approaching or moving away) may be set to be associated with respective interest levels, such that when a user moves faster, the device operates at a higher incremental interest level mapped to the user's a first velocity, and when a user moves at a second velocity slower than the first velocity, the device operates at a lower incremental interest level mapped to the user's slower second velocity.

"State of electronic device" may be classified or controlled depending on the level of power consumption. For example, the state of electronic device may be classified into an inactivated state (e.g., a partially activated) and an activated state.

The inactivated state may include at least one of a sleep state, an idle state, or a suspended state. For example, the inactivated state may be a status in which the electronic device may operate in minimum power consumption. As another example, the inactivated state may be a state in which some of the sensors may operate. As another example, the inactivated state may be a state in which at least one first-type sensor may operate alone.

The activated state may include at least one of a wake-up state, a standby state, a ready state, a normal state, or an operating state. For example, the activated state may be a state in which the electronic device operates in a higher level of standby power than the minimum power or in a higher level of normal power than the standby power. As another example, the activated state may be a state in which more sensors may be operated than in the inactivated state. As another example, the activated state may be a state in which at least one first-type sensor and at least one second-type sensor all may be operated.

FIG. 1 is a view illustrating the concept of intelligent interaction using an example.

In operation 110, an electronic device (e.g., a smart speaker device) may obtain sensing information about the user's action. That is, the electronic device may detect, through sensors, one or more user actions.

In operation 120, the electronic device may recognize the user's action (e.g., a user motion) based on the sensing information. That is, the electronic device may interpret or retrieve identification of a known user action based on the obtained sensor information.

In operation 130, the electronic device may perform the function corresponding to the user's action. That is, the electronic device may identify a function corresponding to the known user action, and executed the identified function.

For example, the electronic device may perform a function according to the user's specific action (e.g., approach to the electronic device). Upon recognizing the user's specific action, the electronic device may determine that the user has the intent to dialog with the electronic device and switch the inactivated state (e.g., sleep state) into the activated state (e.g., wake-up, listening, and speaking state).

As another example, the electronic device may perform the function (e.g., play music) according to the user's specific continuous actions. Upon recognizing the user's second action (e.g., voice command "Play music") subsequent to the user's first action (e.g., approach), the electronic device may perform a function (e.g., play music) in response thereto.

In the intelligent interaction as shown in FIG. 1, the user's action may be an intentional action for performing the function. The same function may be performed according to the user's specific intentional action. For example, there are possible functions such as the function of waking up a smartphone in response to a wake-up word (e.g., "Hi Bixby," "OK Google," or "Hey, Siri"), the function of turning on the screen of the smartphone when the user lifts an arm wearing a smartwatch, and the function of unlocking a smartphone when the user gazes at the smartphone.

In this case, as described above, the electronic device may simply react to the user's specific action and perform the same function in the same representation.

Figure 2:
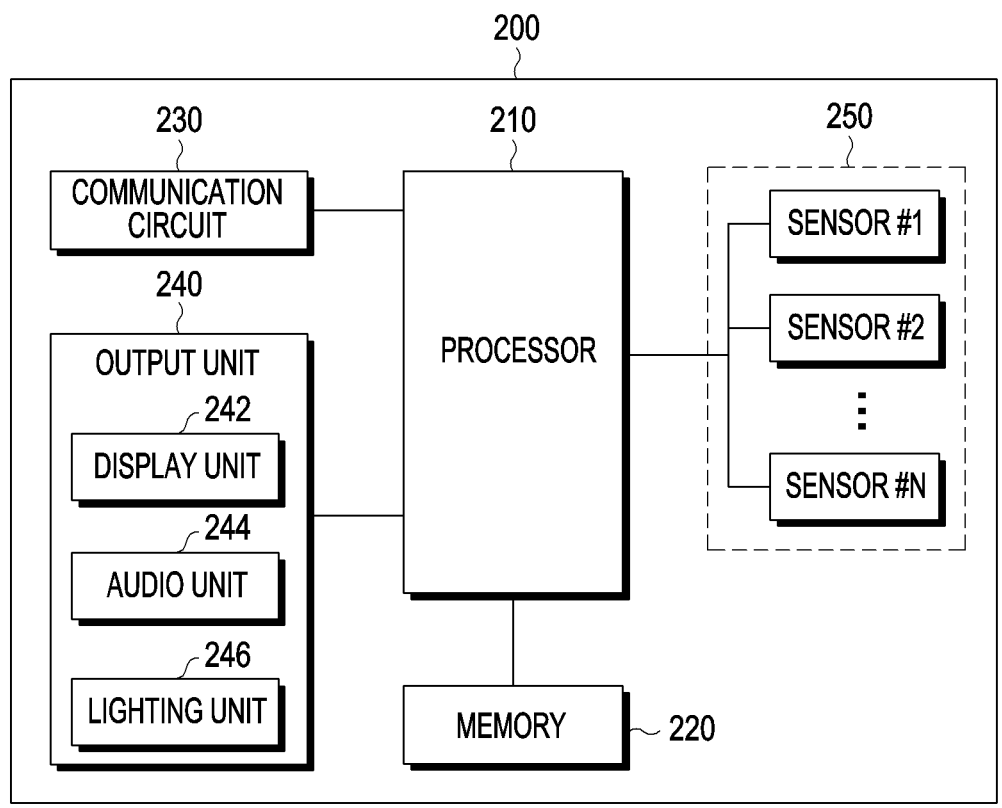
FIG. 2 is a block diagram illustrating an electronic device according to an example embodiment.

FIG. 2 is a block diagram illustrating an electronic device according to an embodiment.

According to an embodiment, an electronic device 200 may include a processor 210 and a memory 220. The processor 210 and the memory 220 may be electrically and/or operatively connected with each other and exchange signals (e.g., commands or data) therebetween. The electronic device 200 may further include at least one of a communication circuit 230 or an output unit 240. The electronic device 200 may further include at least one sensor 250.

The electronic device 200 (e.g., a smart speaker device, smartphone, or smart home appliance) may be a device that provides at least one function (e.g., dialog function, communication function, Internet function, alarm function, wake-up function, or on/off function) in response to the user's action.

The processor 210 may obtain sensing information (e.g., at least one of a sensing value, data obtained based on the sensing value, data extracted from the sensing value, sensed image data, or sensor identification information) from at least one sensor 250.

According to an embodiment, the processor 210 may use specific information (e.g., interest level) identified from the user's unintentional action.

According to an embodiment, upon performing the function according to the user's intentional action, the processor 210 may consider the specific information identified from the user's unintentional action.

The processor 210 may obtain first sensing information from at least one sensor 250.

The processor 210 may identify whether the first sensing information is the first type of sensing information or the second type of sensing information based on information about types of sensing information previously stored. The first type of sensing information may be sensing information related to the user's unintentional action. The second type of sensing information may be sensing information related to the user's intentional action.

When the first sensing information is the first type of sensing information, the processor 210 may determine the specific information based on the obtained first sensing information. The specific information may be the level of interest in the user.

The memory 220 may store information about the type of sensing information. The information about the type of sensing information may be stored in an outside of the electronic device 200 (e.g., a server connected with the electronic device 200).

The information about the type of sensing information may be information that functions as a reference to classify the first type of sensing information and the second type of sensing information. For example, the information about the type of sensing information may include at least one of information to designate the type of sensing information that belongs to the first type, information to designate the type of sensing information that belongs to the second type, information to designate the type of sensor that belongs to the first type, or information to designate the type of sensor that belongs to the second type.

For example, the information to designate the second type of sensing information (e.g., a specific wake-up word) for performing a function and the information about the function (e.g., switch into the wake-up and listening state) may be matched to each other and be stored.

As another example, the information to designate the second type of sensing information for performing a function may be previously stored whereas the information to designate the first type of sensing information for identifying the specific information (e.g., interest level) may not previously be stored. In this case, the first type of sensing information may be other sensing information than the predesignated second type of sensing information. The first type of sensing information may be related to the user's unintentional action, and the specific information may be identified from the first type of sensing information. The user's unintentional action may be a part corresponding to a tiny difference in the user's action (e.g., move around the electronic device 200) other than the user's intentional action (e.g., approach to turn on the electronic device 200) corresponding to the specific function.

The processor 210 may obtain second sensing information from at least one sensor 250.

The processor 210 may identify whether the second sensing information is the first type of sensing information or the second type of sensing information based on information about types of sensing information previously stored.

When the second sensing information is the second type of sensing information for performing a first function, the processor 210 may perform a second function related to the first function based on the second sensing information and the determined specific information. The second function may be at least one of a plurality of functions including the first function or a modified function of the first function.

As the function is performed under the control of the processor 210, visible or audible information corresponding to the function may be output through the output unit 240. The processor 210 may control the output unit 240 according to the function performed.

The output unit 240 may include at least one of a display unit 242, an audio unit 244, or a lighting unit 246.

The display unit 242 may display a screen under the control of the processor 210 and visually provide information through the screen to the outside (e.g., the user) of the electronic device 200.

The audio unit 244 may output an audio signal (e.g., voice or sound) to the outside of the electronic device 200 under the control of the processor 210 and audibly provide information to the outside (e.g., the user) of the electronic device 200.

The lighting unit 246 may include at least one light (e.g., a light emitting diode (LED)) which operates under the control of the processor 210 and provide information to the outside (e.g., the user) of the electronic device 200 by lighting.

The at least one sensor 250 may be installed in the electronic device 200. The at least one sensor 250 may be installed outside the electronic device 200. For example, when the electronic device 200 is a smart speaker device, a plurality of sensors 250 may be distributed in the living room where the electronic device 200 is placed and sense various pieces of sensing information. In this case, the electronic device 200 may receive the pieces of sensing information through the communication circuit 230. Some of the plurality of sensors 250 may be installed in the electronic device 200, and others may be installed outside the electronic device 200.

Each sensor 250 may be one for detecting the user's action. Each sensor 250 may provide sensing information about the user's action.

Each sensor 250 may provide at least one of a first type of sensing information or second type of sensing information.

For example, each sensor 250 may be a first sensor (e.g., a speed sensor) for providing a first type of sensing information or a second sensor (e.g., a position sensor) for providing a second type of sensing information.

As another example, each sensor 250 may be a multi-sensor capable of providing both the first type of sensing information and second type of sensing information. As another example, each sensor 250 may be a multi-sensor (e.g., a camera image sensor) for providing sensing information which is capable of extracting at least one of the first type of sensing information and the second type of sensing information.

According to an embodiment, the processor 210 may perform the first function based on specific information (e.g., interest level) identified from the user's unintentional action. Unless the specific information is identified, the processor 210 may perform the second function according to the user's intentional action.

To that end, the processor 210 may obtain sensing information related to the user's action. Based on the obtained sensing information being the first-type information, the processor 210 may determine the specific information corresponding to the first sensing information. The processor 210 may perform the first function (e.g., the function of representing the interest level) based on the specific information. Based on the obtained sensing information being the second-type information, the processor 210 may perform the second function (e.g., dialog function) corresponding to the sensing information.

Figure 10:
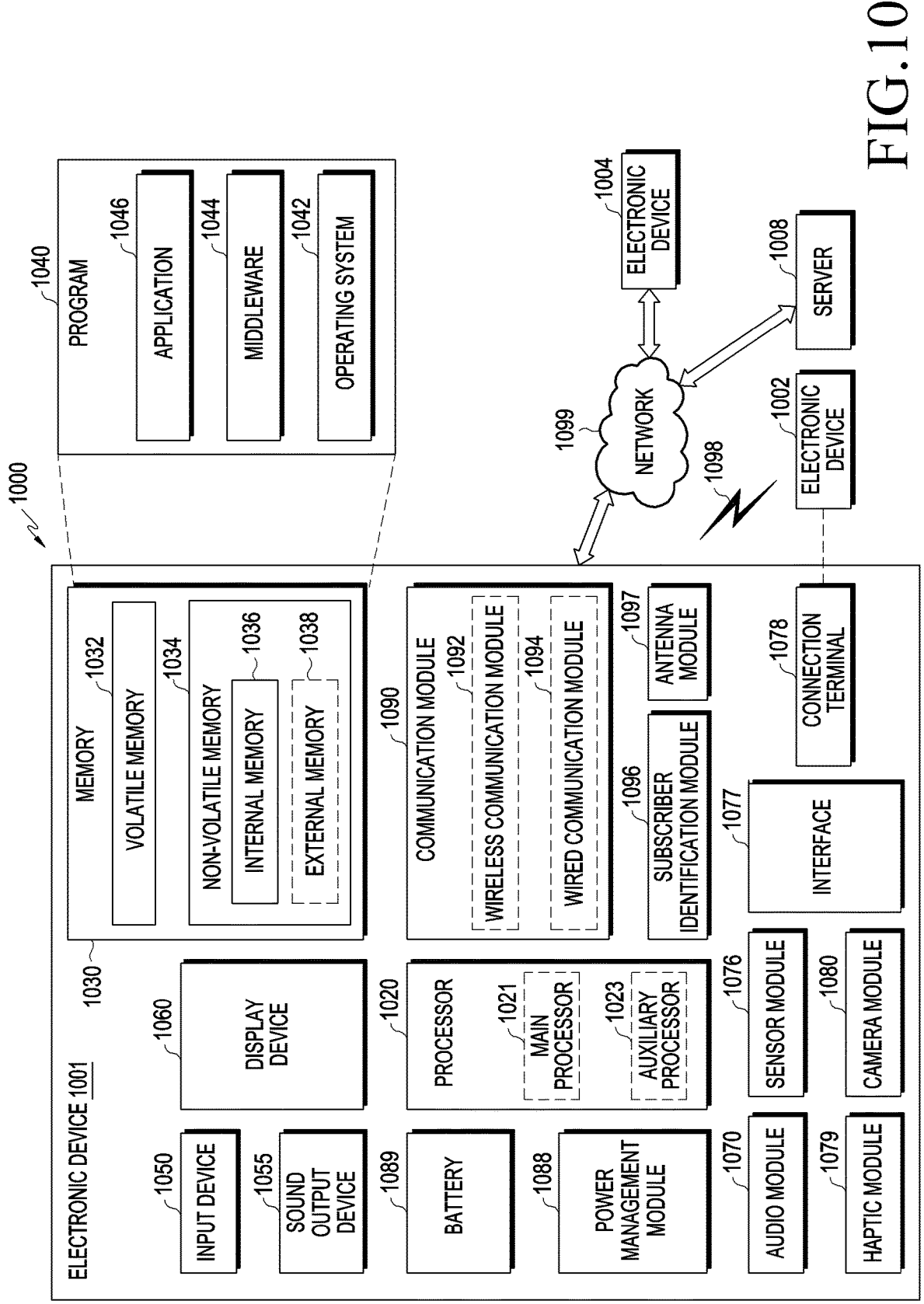
FIG. 10 is a block diagram illustrating an electronic device in a network environment according to an example embodiment.

The electronic device 200 may include the whole or part of the electronic device 1001 shown in FIG. 10.

For example, the processor 210, memory 220, and communication circuit 230 of the electronic device 200 may correspond to the processor 1020, memory 1030, and communication module 1090, respectively, of the electronic device 1001 shown in FIG. 10. At least one sensor 250 may correspond to at least one of the sensor module 1076, camera module 1080, or haptic module 1079. The display unit 242 or lighting unit 246 of the electronic device 200 may correspond to the display device 1060. The audio unit 244 of the electronic device 200 may correspond to at least one of the audio module 1070 or the sound output device 1055.

Figure 3:
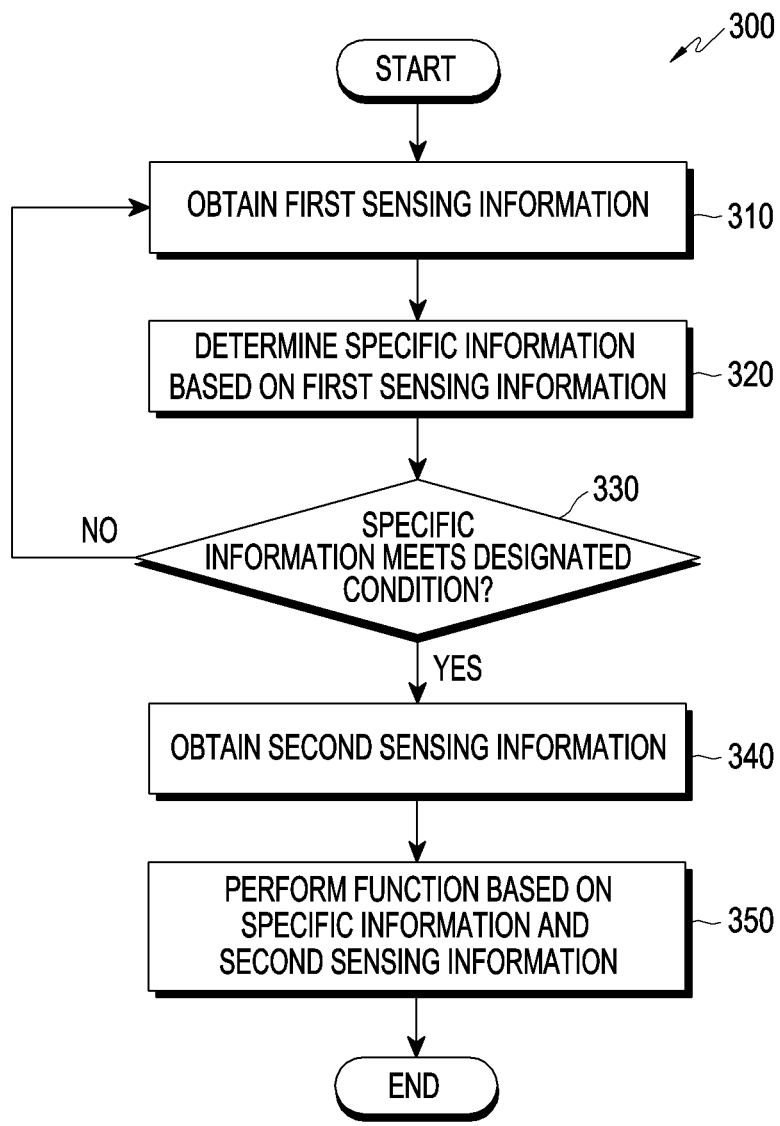
FIG. 3 is a flowchart illustrating a method of intelligent interaction of an electronic device according to an example embodiment.

FIG. 3 is a flowchart 300 illustrating a method of intelligent interaction of an electronic device according to an embodiment.

According to an example embodiment, sensing information obtained by the electronic device 200 may be classified into a first type and a second type. Each piece of sensing information may be related to a user action. Each piece of sensing information may be obtained from at least one sensor 250.

In operation 310, the electronic device 200 may obtain first sensing information related to a user's action. For example, the electronic device 200 may obtain the first sensing information in the inactivated state (e.g., sleep state). Detection functions executed within operation 310 may be utilized to monitor the user's action.

According to an embodiment, the first sensing information may be obtained from at least one first sensor among a plurality of sensors 250, configured for monitoring the user's action. The first sensing information may be obtained periodically, or upon occurrence of an event (e.g., when the user's approach speed reaches a designated threshold velocity or more).

When various types of detection are continuously operative (e.g., when the camera keeps on or when several sensors keep on running), power consumption may increase to save power, some of the plurality of sensors 250 (less than an entirety) may be operated for monitoring of the user. Accordingly, power savings may be realized, thus allowing the user's action to be monitored with the minimum power.

In operation 320, the electronic device 200 may identify that the first sensing information is a first type of information related to an unintentional action. The first type of information may relate to unintentional actions (indirect, unconscious, or non-trigger). The first type of information may be information for identifying specific information utilized for determining the user's intent. When the first sensing information is the first type of information related to the unintentional action, the electronic device 200 may determine the specific information (e.g., the device interest level) based on the first sensing information.

According to an embodiment, the specific information may be the interest level. As described above, the interest level may indicate a value or degree, representing a "level of interest" that the electronic device 200 has in the user. Practically, the interest level may increase the sensitivity and responsiveness of the device 200 to user inputs.

According to an embodiment, the mapping of the value of the specific information (e.g., interest level) to sensor inputs may be set such that the interest level is more sensitive to an increase in user velocity than a decrease in user velocity. Further, the value of the specific information may be set to decrease over time upon a lack of detection of user inputs, or other conditions, such as a lack of change in the sensor inputs from the user's activity.

In operation 330, the electronic device 200 may identify whether the specific information determined in operation 320 meets a predesignated condition. It is understood in other embodiments of the invention, operation 330 may be omitted.

Returning to the present embodiment, for example, the designated condition may be at least one of: the value of specific information being higher than a threshold, the value of specific information being higher than a threshold for a first time period or more, the increase in the interest level of the device is equal to or greater than a predesignated rate of change, and when the current value (the Nth value) of specific information is greater than the previous value (the N-1th value) by a designated offset value or more.

When the specific information fails to meet the designated condition in operation 330, the electronic device 200 returns to operation 310, and continues monitoring for user actions.

When the specific information is identified to meet the designated condition in operation 330, the electronic device 200 may obtain the second sensing information related to the user's action in operation 340. According to an embodiment, the second sensing information may be obtained from at least one second sensor among the plurality of sensors 250.

For example, the first sensor may operate in operation 310 (i.e., without other sensors). When the designated condition of operation 330 is met while the first sensor operates, the second sensor may additionally operate in operation 340.

The first sensor may operate in operation 310 so that the electronic device 200 may monitor the user's action with low power consumption, and recognize a variation in the specific information (e.g., interest level) by the operating first sensor. When the value of the specific information falls within a predetermined range (e.g., when the interest level becomes higher than a designated threshold), more, or more types of, sensors may be activated (e.g., the second sensor may additionally operate).

When no variation in the specific information is recognized (e.g., when the interest level is zero or lower than a threshold), the first sensing information which involves intelligent interaction may be brief information. When a variation in the specific information is recognized (e.g., when the interest level is higher than the threshold), the second sensing information which involves intelligent interaction may be further detailed information. According to an embodiment, the electronic device 200 may switch the state of the electronic device 200 from the inactivated state (e.g., sleep state) to the activated state (e.g., wake-up state) based on the specific information. The electronic device 200 may obtain the second sensing information to sense the user's intentional action in the activated state.

For example, the electronic device 200 may obtain the second sensing information based on the value of specific information being higher than the threshold. The electronic device 200 may stop obtaining the second sensing information based on the value of specific information being lower than the threshold.

In operation 350, the electronic device 200 may identify that the second sensing information is the second type of information. The second type of information may be related to the user's "intentional" action (e.g., a direct action or trigger) for performing the first function.

When the second sensing information is the second type of sensing information related to the intentional action, the electronic device 200 may perform the second function related to the first function considering the determined specific information and the second sensing information together. For example, the second function may be at least one of a plurality of functions including the first function or a modified function of the first function.

The electronic device 200 may recognize the user's intentional action (e.g., an action for triggering the dialog function or gaze at the electronic device 200 within a predetermined distance) to perform the specific function based on the second type of sensing information (e.g., at least one of the distance to the user or the direction of gaze) and perform the function (e.g., dialog function). Upon grasping the user's intent, the electronic device 200 may diversify function representations considering the user's intentional action together with the specific information determined based on the first type of sensing information (e.g., at least one of the moving speed, approaching speed, or angular speed) related to the user's unintentional action.

Described with reference to FIG. 3 is an example scenario for diversifying the representation of the specific function (e.g., dialog function) using the specific information (e.g., interest level).

Considering intentional actions alone, the electronic device 200, when the user's intentional action for function #1 (e.g., wake-up) occurs, may perform the function (e.g., dialog function) in response to the second type of sensing information to sense the same. In this case, the same function may be represented in the same form.

Considering the user's intentional action together with the specific information (e.g., interest level) determined from the unintentional action, the electronic device 200, when the user's intentional action occurs, may properly select and perform at least one of function #1 (e.g., wake-up), an expanded function #2 (e.g., wake-up+voice) of function #1, or function #3 (e.g., briefing) based on the specific information.

According to an embodiment, the specific information (e.g., interest level) may be determined according to the user's unintentional action. Use of the specific information (e.g., interest level) may lead to various reactions (perform various types of functions) depending on tiny differences in the user's action. This may address the issue that functions are performed in the same form irrespective of the strength of the user's input. It may be possible to represent the same function in different forms according to tiny differences in the user's action. This way may raise the accuracy of grasping the user's intent by utilizing the specific information. A diversity of functions performed may be secured depending on the result of grasping the user's intent. Use of the specific information enables a natural reaction that does not provide such a feeling as if the user artificially controls the device.

Figure 4:
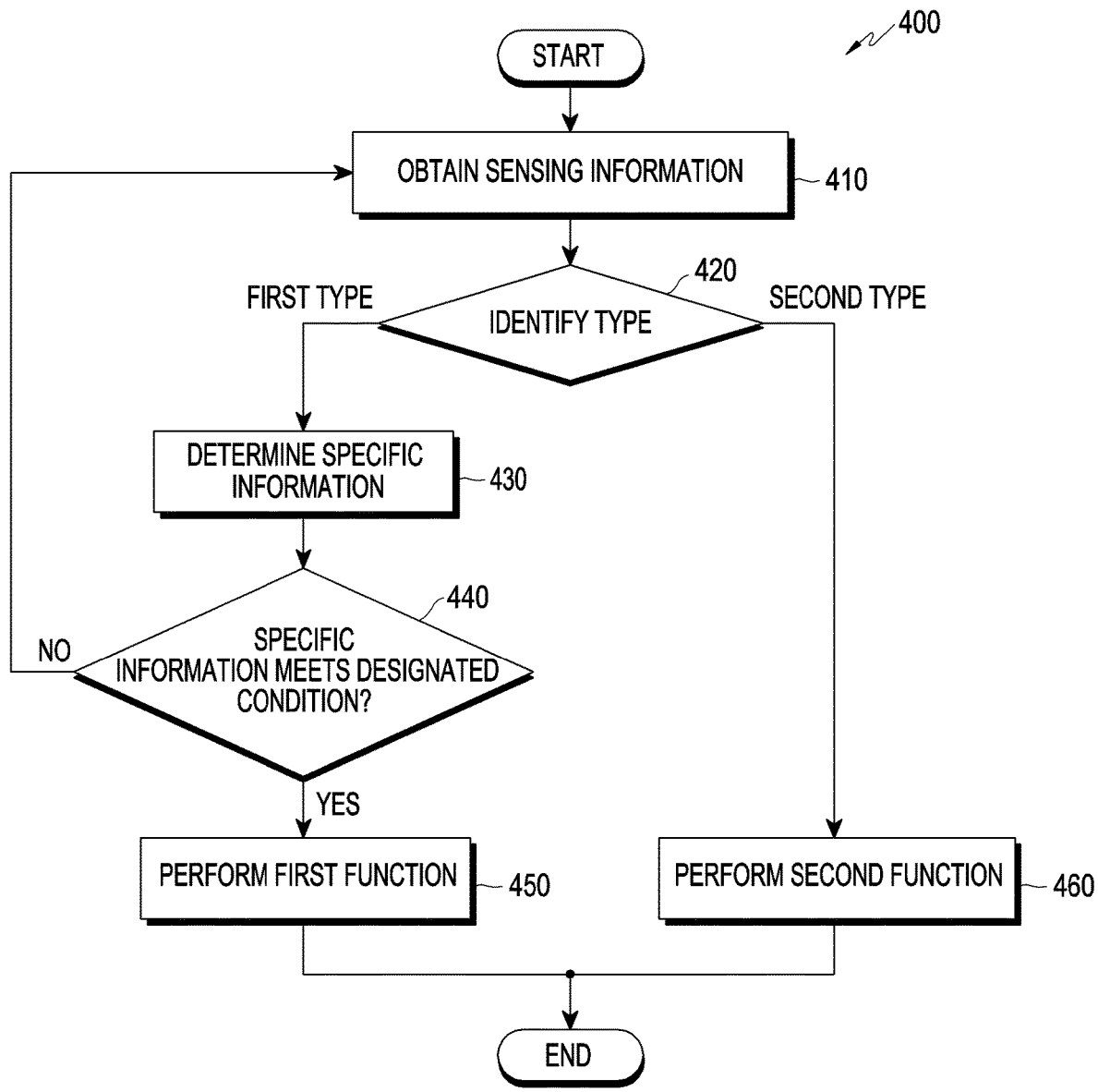
FIG. 4 is a flowchart illustrating a method of intelligent interaction of an electronic device according to an example embodiment.

FIG. 4 is a flowchart 400 illustrating a method of intelligent interaction of an electronic device according to an example embodiment.

In operation 410, the electronic device 200 may obtain sensing information related to a user action. That is, execution of operation 410 may be utilized for monitoring of user actions.

In operation 420, once sensing information is obtained, the electronic device 200 may identify the type of sensing information obtained. According to an embodiment, the sensing information may come in a first type or a second type. The first type of sensing information may be related to the user's unintentional action. The second type of sensing information may be related to the user's intentional action.

When the sensing information is the first type of sensing information related to the user's unintentional action, the electronic device 200 may proceed with operation 430.

In operation 430, the electronic device 200 may determine the specific information (e.g., interest level) corresponding to the sensing information for the user's unintentional action. The specific information may be determined based on the first type of sensing information. The specific information may be information for determining the user's intent.

The increasing rate (e.g, slope) of the value of the specific information may be set to be varied more higher than the decreasing rate (e.g, slope) of the value of the specific information. Thus, the electronic device 200 may responsively react to the user's unintentional action.

In operation 440, the electronic device 200 may identify whether the determined specific information meets a designated condition. It is noted that in some embodiments, operation 440 may be omitted.

Returning to the present embodiment, when the specific information fails to meet the designated condition in operation 440, the electronic device 200 returns to operation 410, and continues monitoring the user's action.

For example, the designated condition may be at least one of: the value of specific information being higher than a threshold, the value of specific information being higher than a threshold for a first time period or more, the increase in the interest level of the device is equal to or greater than a predesignated rate of change, and when the current value (the Nth value) of specific information is greater than the previous value (the N-1th value) by a designated offset value or more.

In operation 450, the electronic device 200 may execute the first function based on the specific information, or based on the specific information meeting the designated condition.

For example, the electronic device 200 may perform the first function based on the value of the specific information being higher than a designated threshold. As another example, the electronic device 200 may perform the first function based on the interest level remaining higher than a threshold for a first time period or more. As another example, the electronic device 200 may perform the first function of visually (e.g., change the brightness of the light depending on variations in the interest level) or audibly representing the variation in the interest level.

According to an embodiment, the first function may be at least one of the function of switching the state of the electronic device from an inactivated state to an activated state, a function prior to the second function, the function of preparing for the second function, the function of waiting for the second function, or a function for representing a change in the specific information.

When the first function is performed so that the electronic device 200 switches from the inactivated state (e.g., sleep state) to the activated state (e.g., wake-up state), the duration of the activated state may be determined based on the specific information. For example, the electronic device 200 may maintain the activated state while the value of the specific information (e.g., interest level) remains higher than the threshold.

When the sensing information is identified in operation 420 to be the second type of sensing information related to the user's intentional action for performing the second function, the electronic device 200 may proceed with operation 460. The second type of sensing information, together with the specific information, may be information utilized to determine a user intent.

In operation 460, when the sensing information indicates the user has executed an intentional action, the electronic device 200 may perform the second function indicated by the sensing information.

According to this, the first function (e.g., represent interest level) may be performed based on the specific information (e.g., interest level) extracted from the sensing information (of first type) for unintentional action. When the user's intentional action for the second function (e.g., dialog function) occurs, this may react to the sensing information (of second type) therefor, and the second function (e.g., dialog function) may thus be performed.

Figure 5:
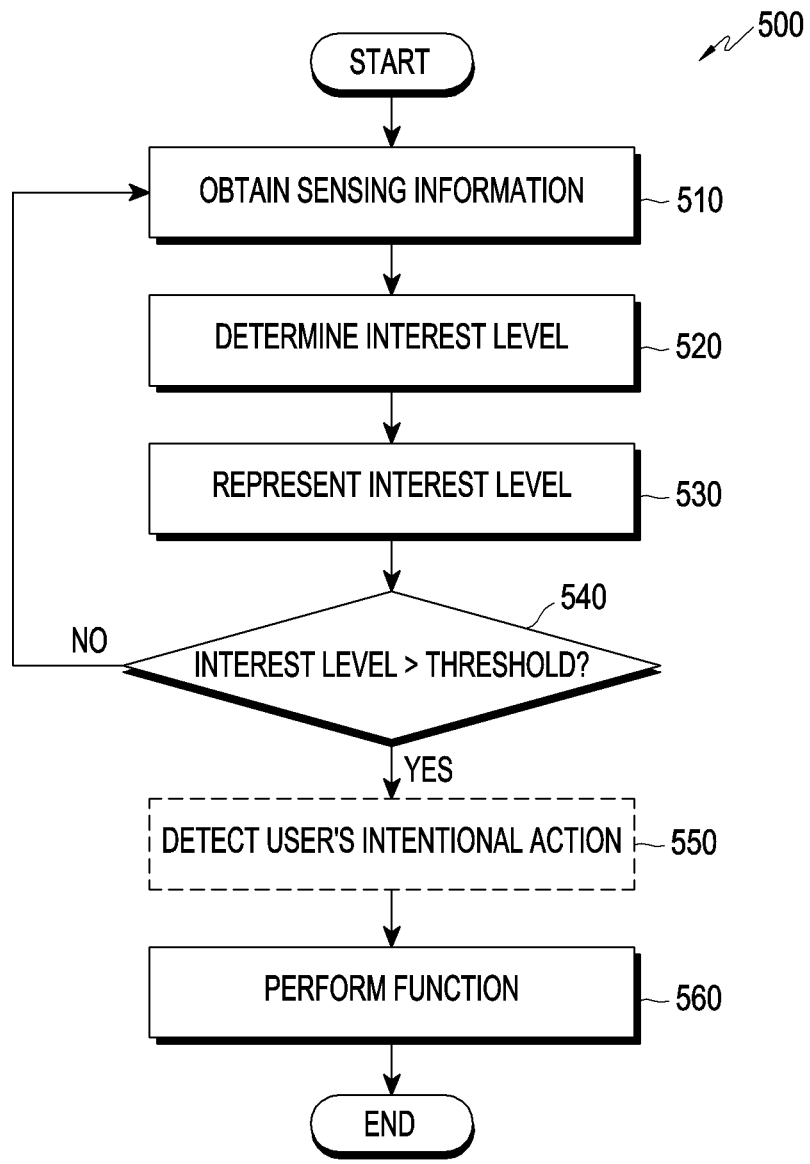
FIG. 5 is a flowchart illustrating a method of intelligent interaction of an electronic device according to an example embodiment.

FIG. 5 is a flowchart 500 illustrating a method of intelligent interaction of an electronic device according to an example embodiment.

In operation 510, the electronic device 200 may obtain the sensing information related to a user's action (e.g., user action information extracted from the user captured image obtained through the camera image sensor). According to an embodiment, the sensing information may include at least one of the first type of sensing information related to the user's unintentional action or the second type of sensing information related to the user's intentional action.

The sensing information may be obtained from at least one sensor 250 included in the electronic device 200 or installed outside the electronic device 200.

In operation 520, the electronic device 200 may determine the level of interest in the user of the electronic device 200 based on the obtained sensing information.

For example, the sensing information may indicate the user is moving around the electronic device 200 at a particular velocity. Based on the sensing information, the interest level may be calculated, and then analyzed to determine whether it is higher than a designated threshold (e.g., whether a present interest level is greater than or equal to a designated threshold interest level). For example, when the particular velocity is relatively higher, the interest level may be calculated as relatively higher value. When the user moves around the electronic device 200 at particular velocity, the interest level may be determine to be a particular interest level previously set to correlate with the particular detected speed. In this way, algorithmic values of an interest level of the device 200 can be determined.

In operation 530, the electronic device 200 may perform the function of representing the interest level. In some embodiments, it is noted that operation 530 may be omitted.

Returning to the present embodiment, for example, when the user's movements near the electronic device 200 indicate an interest level value that reaches a sufficient threshold value, the electronic device 200 may react to the user's action, turning up the lighting unit 246, which may represent to the user a relatively "high" interest level.

When the user's movements near the electronic device 200 indicate an interest level value that does not reach the threshold value, the electronic device 200 may respond differently to the user's action, reducing light output of the lighting unit 246, which may represent to the user a relatively "low" interest level.

Operations 540 and 550 may be operations for determining the user's intent.

Considering both the interest level and the user's intentional action allows the user's intent to be interpreted more correctly than considering the user's intentional action alone.

In operation 540, the electronic device 200 may identify whether the determined interest level is higher than the threshold value.

When the interest level is lower than the threshold, the electronic device 200 may return operation 510, and continue monitoring the user's actions.

When the interest level is higher than threshold, the electronic device 200 may proceed with operation 550.

In operation 550, the electronic device 200 may detect the user's intentional action.

According to an embodiment, the electronic device 200 may detect the user's intentional action for performing the first function from the sensing information obtained in operation 510.

In operation 560, the electronic device 200 may perform the second function related to the first function based on the user's intentional action and the interest level. The second function may be at least one of a plurality of functions including the first function or a modified function of the first function.

An example scenario according to the embodiment of FIG. 5 is as follows.

When the user's intentional (trigger) action for performing function #1 (e.g., wake-up) occurs, the electronic device 200 may identify the user's intentional action from the sensing information.

The electronic device 200 may react to the user's intentional action and determine to perform function #1 (e.g., wake-up), in which case the electronic device 200 may properly select and perform at least one of functions related to function #1 (e.g., wake-up), e.g., function #1 (e.g., wake-up), function #2 (e.g., wake-up+voice) which is an expanded function of function #1, and function #3 (e.g., briefing) considering the interest level.

Another example scenario according to the embodiment of FIG. 5 is as follows.

For example, when the user slowly moves around the electronic device 200, the electronic device 200 may react to the user's action, turning down the lighting unit 246 (the first function, represents a change in interest level). The electronic device 200 may calculate the value of interest level based on the sensing information (e.g., moving speed) about the user's action. The value of interest level may be calculated to be lower than the threshold according to the user's action (unintentional action).

In this state, although the user's gaze (the intentional action for the second function) meets the electronic device 200, the electronic device 200 may refrain from the dialog function (second function) since the value of specific information is lower than the threshold.

When the user moves around the electronic device 200 at moderate speed (medium interest level), the electronic device 200 may react to the user's action, turning up the lighting unit 246 (first function, represents a change in interest level). The electronic device 200 may calculate the value of interest level based on the sensing information (e.g., moving speed) about the user's action. The value of interest level may be calculated to be a medium value according to the user's action (unintentional action).

When the user's gaze meets the electronic device 200 (the intentional action for the second function) in this state, the electronic device 200 may react to the user's action to perform the dialog function (second function, e.g., wake-up→"Hi"→standby in listening state).

Figure 6:
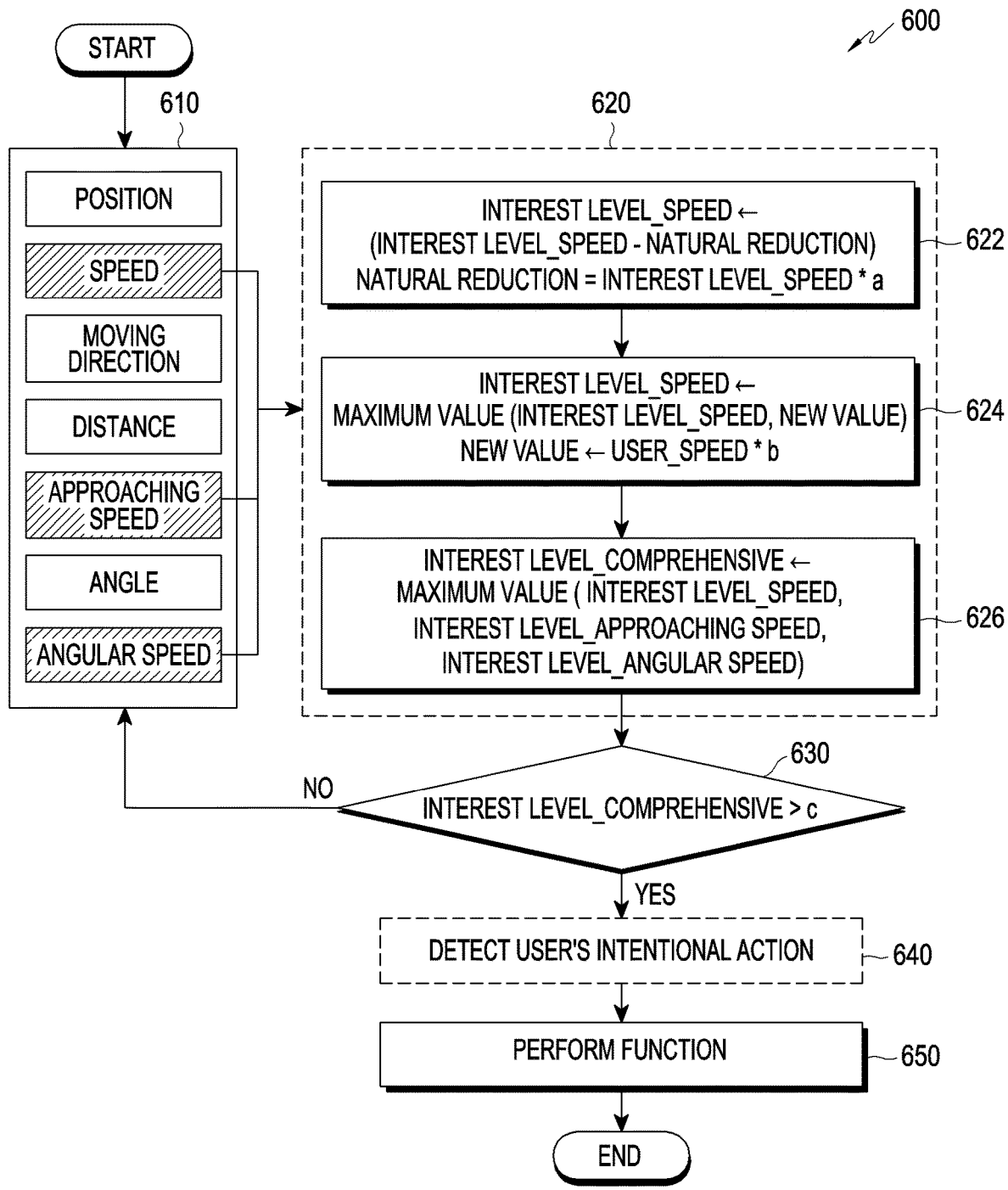
FIG. 6 is a flowchart illustrating a method of intelligent interaction of an electronic device according to an example embodiment.

FIG. 6 is a flowchart 600 illustrating a method of intelligent interaction of an electronic device according to an embodiment.

Operations 610, 620, 630, 640, and 650 of FIG. 6 may correspond to operations 510, 520, 540, 550, and 560, respectively, of FIG. 5.

The sensing information obtained through the electronic device 200 may come in two types, e.g., first type and second type or unintentional and intentional.

For example, the sensing information may be classified into the types based on the type of sensor (e.g., position sensor or approaching speed sensor) or the type of sensing information (e.g., position or approaching speed).

For example, the second type of sensor (e.g., position sensor) or sensing information (e.g., position value) obtained from the second type of sensor may be classified as the second type of sensing information. The first type of sensor (e.g., approaching speed sensor), sensing information (e.g., approaching speed value) obtained from the first type of sensor, and sensing information (e.g., approaching speed value) obtained by processing the sensing information (e.g., position value) of the second type of sensor (e.g., position sensor) may be classified as the first type of sensing information. The first type of sensing information may be obtained by the first type of sensor which differs from the second type of sensor or may be obtained by processing the sensing information from the second type of sensor. The first type of sensing information (e.g., position) and the second type of sensing information may be obtained from a single piece of sensing information (e.g., image). Each piece of sensing information may be obtained by combining one or more sensing values.

At least part of reference information (e.g., information for designating pieces of sensing information classified as the first type of sensing information or second type of sensing information or information for designating the first type of sensor or the second type of sensor) for classifying the sensing information may previously be stored in the electronic device 200.

For example, when N sensors are installed on the electronic device 200 or the electronic device 200 is connected with N sensors, each of the N sensors may be classified as the first type of sensor belonging to a first category or the second type of sensor belonging to a second category. Sensing information from the first type of sensor may be defined as the first type of sensing information, and sensing information from the second type of sensor may be defined as the second type of sensing information. As another example, the first type of sensing information may be obtained from the first type of sensor which is one of the N sensors. The second type of sensing information may be obtained from the others of the N sensors, which are the second type of sensors. The second type of sensing information may include part of the sensing information obtained based on the first type of sensing information obtained from the first type of sensor.

The first type of sensing information may be obtained from the first type of sensor, and the second type of sensing information may be obtained from the second type of sensor which differs from the first type of sensor.

According to an embodiment, the second type of sensing information may be information processed based on the first type of sensing information.

According to an embodiment, the second type of sensing information and the second type of sensing information may be obtained from a single piece of sensing information (e.g., image). Each piece of sensing information may be obtained by combining one or more sensing values.

In the example of FIG. 6, speed, approaching speed, or angular speed may be the first type of sensing information. Position, movement direction, distance, and angle may be the second type of sensing information.

The first type of sensing information may be related to the user's unintentional action. The second type of sensing information may be related to the user's intentional action.

The second type of sensing information may be sensing information corresponding to an action (intentional action) that the user may relatively easily predict or control to perform the first function. As compared with this, the first type of sensing information may be sensing information corresponding to an action (unintentional action) that may be difficult for the user to predict or control, such as approaching speed or angular speed.

Use of the user's unintentional action information may lessen such a feeling as if it is being controlled by the user. This may save the user the need for separate learning.

In operation 610, the electronic device 200 may obtain at least one piece of sensing information. The sensing information may include a first type of sensing information related to the user's unintentional action.

In operation 620, the electronic device 200 may determine the interest level based on the obtained sensing information. To determine the interest level, one or more pieces of first type of sensing information (e.g., at least one of speed, approaching speed, or angular speed) may be utilized.

Operation 630 may include at least one of operations 622, 624, and 626.

In operation 630, the electronic device 200 may determine whether the interest level is reduced, based on each piece of sensing information. For example, the electronic device 200 may determine whether the interest level is reduced based on the speed (or approaching speed or angular speed), as determined by Equation 1.

Interest level_speed←(Interest level_speed−Natural reduction)

Natural reduction=Interest level_speed×$a$     [Equation 1]

Here, "interest level_speed" may denote the value of interest level calculated based on the user's speed, and "natural reduction" may denote the value indicating the natural decrease rate. Constant 'a' may be, e.g., 0.01.

The reaction speed of the electronic device 200 may be adjusted by adjusting 'a'. For example, reducing 'a' from 0.01 to 0.005 may decrease the natural decreasing rate of interest level, thus reducing a reductive rate of change in the interest level. When the rate of change for the interest level is reduced, the interest level more "gradually" reduces over time. Thus, a duration of a wake-up state for the electronic device 200 may be increased, beginning from an initial value of interest level that decreases over time.

In operation 630, the electronic device 200 may determine whether the interest level increases based on each piece of sensing information. For example, the electronic device 200 may determine whether the interest level increases based on the speed (or approaching speed or angular speed) by Equation 2.

Interest level_speed←Maximum value(Interest level_ speed,New value)

New value←User_speed×$b$     [Equation 2]

Here, "interest level_speed" may denote the value of interest level calculated based on the speed, and "user_ speed" may denote sensing information about the user's speed. Constant 'b' may be, e.g., 2.

The reaction speed (e.g., sensitivity) of the electronic device 200 may be adjusted by adjusting 'b'. For example, increasing 'b' from 2 to 2.5 may alter the mapping of interest level to sensor input, such that the interest level increases more rapidly for a given change in sensor input. When the interest level is set to be more sensitive to a sensor input in this way, the interest level will more rapidly increase in accordance with a sensor input. Thus, as the sensitivity of the device 200 to a sensor input is increased, the electronic device 200 may, for example, switch from the sleep state to the wake-up state within a relative shorter time based on the interest level with the heightened sensitivity.

In operation 620, the electronic device 200 may calculate the comprehensive interest level by Equation 3, as seen below:

$$\text{Interest level\_comprehensive} \leftarrow \text{Maximum value}(\text{Interest level\_speed}, \text{Interest level\_approaching speed}, \text{Interest level\_angular speed}) \quad \text{[Equation 3]}$$

Here, "interest level_comprehensive" may indicate a maximum value among the interest levels calculated based on the speed, approaching speed, and angular speed.

In operation 630, the electronic device 200 may identify whether the interest level is greater than a designated threshold. For example, the electronic device 200 may identify whether the comprehensive interest level calculated in operation 620 is greater than threshold 'c' (e.g., c=0.5).

When the interest level is identified in operation 630 as greater than the threshold, the electronic device 200 may proceed with operation 640.

In operation 640, the electronic device 200 may detect the user's intentional action.

In operation 650, the electronic device 200 may perform a function based on the interest level and the user's intentional action.

Figure 7:
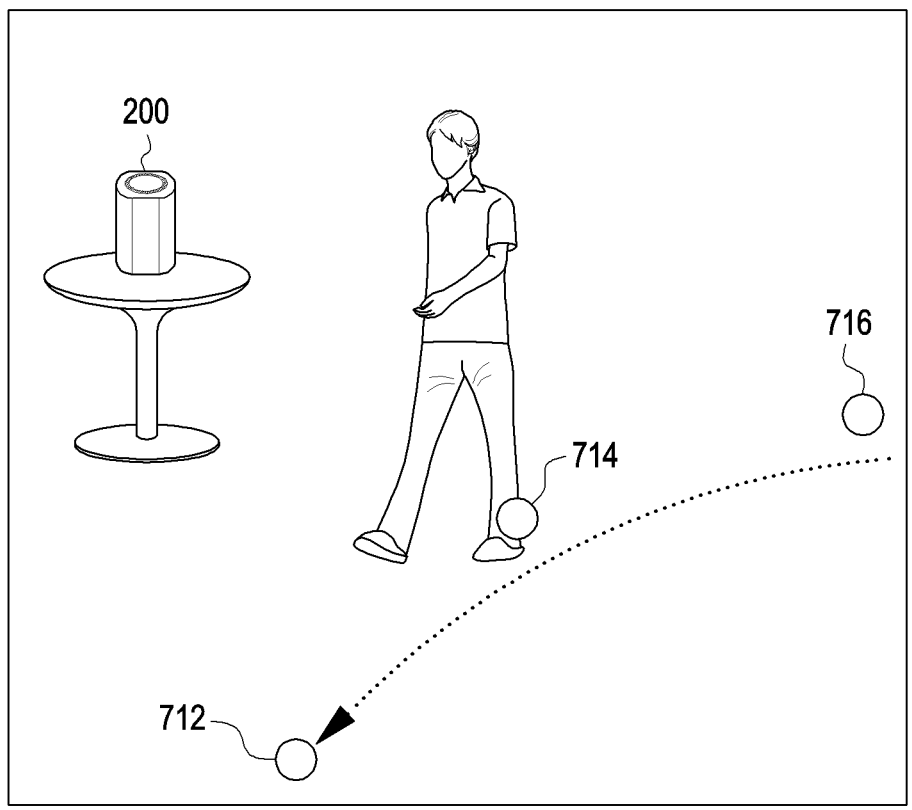
FIG. 7 is a view illustrating the concept of various function representations using an example, according to an example embodiment.

FIG. 7 is a view illustrating the concept of various function representations using an example, according to an embodiment.

The diversity of reactions (various function representations) may be utilized in intelligent interaction of the electronic device 200. It may be beneficial to react to the user's little variation to represent the function in another form although the same function is executed. The accuracy of reaction and proper feedback may also be needed in the intelligent interaction of the electronic device 200.

To that end, "unintentional" action information may be used.

According to an embodiment, the electronic device 200 may identify the user's unintentional action from one or more sensor inputs generated as a result of the user's action, and, when sensing the user's intentional action for performing a function, provide feedback or perform the function suited for the context using the identified unintentional action in performing the function.

The unintentional action may be a different type of action from the intentional action, as will be seen below.

According to an embodiment, the unintentional action may be part of or preparation for executing the intentional action. For example, the intentional action may be "pressing a button," "lifting an arm," "eye contact," or "approach within a set distance threshold." Such intentional actions may be interpreted by the device as triggering performance of one or more functions. Here, the "unintentional" action element may refer to user actions performed along with or in tandem with the unintentional action, such as an "approaching speed" or a "moving speed of gaze."

FIG. 7 illustrates an example in which the user is walking to the table on which the electronic device 200 (e.g., a smart speaker device) is placed.

This may lead to various scenario cases, such as the user picking up the book on the table, using the electronic device 200 on the table, or just passing by the table without interaction.

The electronic device 200 may not be able to precisely predict or determine the user's intent, but may intelligently react to the context using the user action information. According to an embodiment, the electronic device 200 may utilize the concept of "interest level" and/or the user's "unintentional" action to generate a correct response to the user's movement.

Various scenarios are described below.

In a first scenario, the user may approach the electronic device 200 at first velocity that meets a certain threshold velocity. Since the user may first speak in this context, the threshold velocity may be associated with a first interest level requiring rapid response to inputs, causing the electronic device 200 to rapidly wake up and execute a stand-by listening state.

In a second scenario, the user may approach the electronic device 200 at a second velocity that is lower than the first velocity, and does not meet the threshold velocity. This indicates a second interest level lower than the first interest level requiring less rapid response to inputs compared to the first scenario. Accordingly, the electronic device 200 may wake up and execute the standby listening state while simultaneously outputting a greeting such as "hello" (insofar as there is likely more time to output to the user before receiving a user's intentional input) before the user speaks.

In a third scenario, the user may pass by the electronic device 200. When the sensor information indicates the user has crossed a threshold distance without stopping, which may be interpreted as "passing by" the device, the electronic device 200 may output information designated as useful to output during "passing by" transitions, such as brief updates, notifications and/or suggestions.

According to an embodiment, the level of interest of the electronic device 200 may be determined by comprehensively considering the user action information. The user action information used in determining the interest level may be unintentional action information.

The unintentional action information or interest level may influence not only the type of function but also the process of performing the function. For example, when the user makes an inquiry while quickly moving, the electronic device 200 may answer at high speed.

From an interest level point of view, there may be various reaction scenarios as follows.

In a first scenario, when the user passes through a first position 716, the interest level may be determined to be level #1. In this level, the device will wait to execute the wake-up state and listening state based on the user's approaching speed (e.g., positive value). The electronic device 200 may detect the user's action and output some notification indicating an attempt to determine whether the user intends to perform an input to trigger a function. Accordingly, when the user approaches the electronic device 200 at high speed, an active lighting variation may be displayed, for example.

In a second scenario, when an optical sensor detects the user is looking at the device (e.g., by gaze detection) at the second position 714, the interest level may be increased to be level #2, in which a state switch is executed based on detecting the user's gaze. For example, the electronic device 200 may determine the user intends to generate an input, and switch from the sleep state to the wake-up and listening state. When the user's motion is frequent, a determination as to whether to switch states may be represented with sound and lighting displays.

In the third scenario, when the user passes the electronic device 200 towards the third position 712 without generating an input, the interest level may be determined to be level #0 at which point the device may return to a sleep state based on the user's approaching speed (e.g., now a negative value). The electronic device 200 may detect the user moving distally away from the electronic device 200 and return to the sleep state. At this time, since the user may re-approach, the electronic device 200 may nonetheless remain in a listening state for a predetermined time before switching into the sleep state.

As set forth above, use of interest level may present various effects, such as a diversity of reactions, accuracy of grasping the user's intent, proper feedback, and natural interaction.

According to an embodiment, the electronic device 200 may receive feedback of interest level and express it. By so doing, the internal state of the electronic device 200 may be represented to the user until the user's intent is recognized by the intentional action.

For example, the electronic device 200 may reflect the interest level, which is a continuous value and embody it as various outputs (e.g., light, sound, or motion).

The electronic device 200 may enable natural cancellation or avoidance during the course of grasping the user's intent by utilizing the interest level. For example, at the time that the electronic device 200 meets the user's eyes by accident and gradually lightens up, the user may identify this and naturally look away with his or her eyes.

The use of interest level may allow the process of grasping the user's intent to proceed seamlessly although a drop occurs in the middle. For example, although the user who attempts to approach the electronic device 200 and issues a command but momentarily takes other actions, such as checking the time, the non-stop or non-initialization of the recognition process may be shown to the user.

Figure 8A:
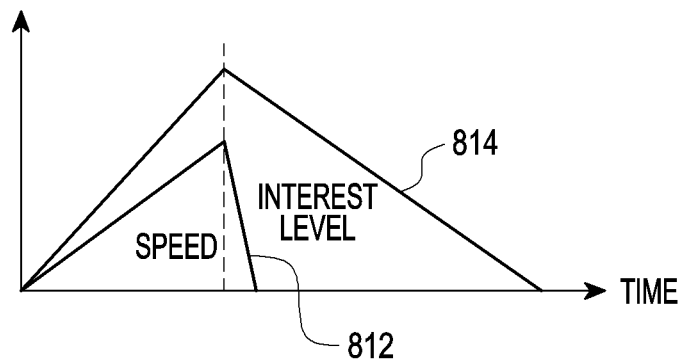
FIG. 8A is a graph illustrating example variations in interest level according to an example embodiment.
Figure 8B:
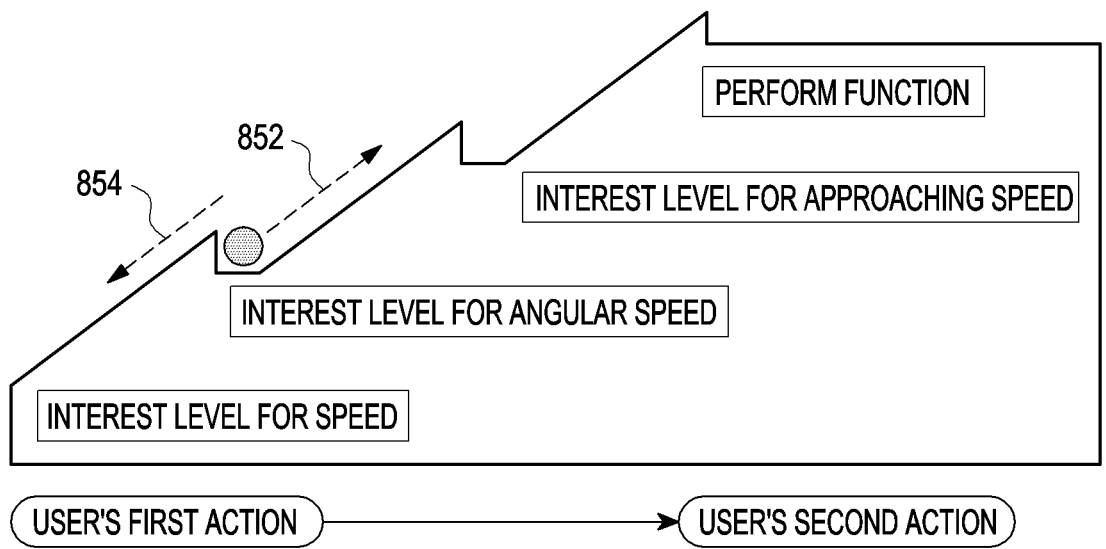
FIG. 8B is a graph illustrating example variations in interest level according to an example embodiment.

FIGS. 8A and 8B are graphs illustrating example variations in interest level according to an embodiment.

Referring to FIG. 8A, the interest level may vary over time as in 814 when the user's speed is varied as in 812. The interest level may increase in the interval where the user quickly approaches the electronic device 200 so that the user's speed increases. The interest level may naturally decrease over time in the subsequent intervals. The decrease in interest level may be slower than the increase.

According to an embodiment, the electronic device 200 may differentiate reactions depending on the direction in which the interest level is varied.

In the example of FIG. 8B, 852 denotes the forward state variation in the interest level. 854 denotes the reverse state variation in the interest level.

The electronic device 200 may react more quickly when the interest level increases than when the interest level decreases (easy forward speed variation). In this case, when the interest level becomes larger than the current value, the interest level may immediately be updated.

The reverse state variation may be harder than the forward state variation. The interest level may naturally lessen over time. The interest level may decrease gradually as compared with when the interest level increases (hard reverse state variation). Thus, the state in which the electronic device 200 stands by to react to the user's intentional action (e.g., wake-up state) may last relatively long, and the electronic device 200 may precisely react to the user's action.

From the user's first action (e.g., approach) to the second action (e.g., dialog), the electronic device 200 may calculate individual interest levels based on the speed, angular speed, and approaching speed and determine the comprehensive interest level (e.g., the largest value among the individual interest levels or the sum or accumulation of at least some of the individual interest levels) from the calculated individual interest levels.

For example, when the comprehensive interest level becomes a sufficiently large value, the electronic device 200 may switch from the sleep state to the wake-up state to grasp the user's intent to perform the first function.

For example, when the comprehensive interest level becomes smaller than a designated threshold, the electronic device 200 may return to the sleep state.

An example scheme of calculating the interest level is as follows.

$$\text{Interest level\_speed} = \text{User moving speed(m/s)} \times 2 \quad [\text{Equation 4}]$$

Here, interest level_speed is the speed interest level (0 at minimum, 1 at maximum), at a speed of 0.5 m/s or more, the maximum interest level arrives.

$$\text{Interest level\_angular speed} = \text{User angular speed(degree/s)} \times 0.04 \quad [\text{Equation 5}]$$

Here, interest level_angular speed is the angular speed interest level (0 at minimum, 1 at maximum), at an angular speed of 25 degree/s or more, the maximum interest level arrives.

$$\text{Interest level\_approach or not} = 1 \text{ or } 0 \quad [\text{Equation 6}]$$

Here, interest level_approach or not is the approaching speed (0 or 1) and is 1 when the user is approaching the electronic device 200 or, otherwise, 0.

$$\text{Interest level\_comprehensive} = \text{MAX}(\text{Interest level\_speed}, \text{Interest level\_angular speed}) \times \text{Interest level\_approach or not} \quad [\text{Equation 7}]$$

Here, interest level_comprehensive is the comprehensive interest level.

$$\text{Interest level\_speed} = \text{Interest level\_speed} - 0.01$$

$$\text{Interest level\_angular speed} = \text{Interest level\_angular speed} - 0.01 \quad [\text{Equation 8}]$$

Here, the speed interest level and the angular speed interest level reflect the natural decrease over time.

FIG. 9A is a table illustrating an example of user action information according to an embodiment.

Examples of user action information include voice, position/distance, moving speed, approaching speed, direction, angular speed, orientation, and hand motion.

For example, part of the user action information may be utilized as intentional action information, and other part as unintentional action information.

According to an embodiment, different references may be applied to the intentional action information and unintentional action information depending on what is the unique or main function of the electronic device 200.

For example, when the electronic device 200 is a smart speaker device, the electronic device 200 may determine the interest level using the moving speed, approaching speed, and angular speed and grasp the user's intent in the direction of the user's gaze.

The direction of the user's gaze may be identified in such a scheme as to grasp a variation in the direction of the user's shoulder from the image obtained from the camera image sensor. When the direction of shoulder faces the electronic device 200, the electronic device 200 may recognize it as meeting the user's eyes.

As another example, the electronic device 200 may perform the intelligent interaction modified or expanded in the form of using various pieces of user action information, such as voice, position, distance, or orientation.

FIG. 9B is a table illustrating various example function representations according to an embodiment.

The electronic device 200 may diversify representations and perform functions on various pieces of user action information.

According to an embodiment, the electronic device 200 may determine the interest level using some unintentional action information (e.g., moving speed, approaching speed, or angular speed) among the pieces of user action information and grasp the user's intent with intentional action information (e.g., the direction of the user's gaze).

Referring to FIG. 9B, e.g., when the user's moving speed, approaching speed, and angular speed are high, the electronic device 200 may react to the direction of the user's gaze at the electronic device 200, performing the wake-up function. For example, the electronic device 200 may perform quick wake-up.

When the user's moving speed, approaching speed, or angular speed are low, quick briefing may be performed.

FIG. 9C is a table illustrating example combinations of user action information and function representations according to an embodiment.

FIG. 9C illustrates various user actions (contexts) based on intentional action information and unintentional action information.

The electronic device 200 may grasp a variation in interest level based on the moving speed or angular speed which is the unintentional action information. The electronic device 200 may grasp the user's (direct) intent to perform the function in the direction of gaze which is the intentional action information.

Feedback and functions may be performed based on the user's intent considering the interest level.

For example, when the user slowly moves around the electronic device 200 (context #1, low interest level), the electronic device 200 may react to the user's action, turning down the light (represents interest level). In this context, although meeting the user's eyes (context #2), the electronic device 200 may not perform a function (e.g., dialog function) due to the low interest level. It is noted that descriptors such as "slowly," "moderate," "quickly," and other such valuations can be determined by predesignating certain velocity values to correspond with preset velocity categories (slow, fast, moderate, etc.). Accordingly, a particular velocity value can be algorithmically adjudged as "slow" or "fast," etc. based on whether it falls within a range of velocities designated categorically as "slow, "fast," etc.

When the user moves around the electronic device 200 at moderate speed (context #3, medium interest level), the electronic device 200 may react to the user's action, turning up the light (represents interest level). In this context, when meeting the user's eyes (context #4), the electronic device 200 may react to the user's action, performing a function (e.g., dialog function, wake-up→"hi"→stand by in listening state).

When the user quickly moves around the electronic device 200 (context #6, high interest level), the electronic device 200 may react to the user's action, turning more up the light (represents interest level). In this context, when meeting the user's eyes (context #7), the electronic device 200 may react to the user's action, performing a function (e.g., dialog function, wake-up→stand by in listening state).

According to an embodiment, an electronic device may include a memory and a processor operatively connected with the memory. The memory may store instructions executed to enable the processor to obtain first sensing information related to a user's action, determine specific information corresponding to the first sensing information based on the first sensing information being a first type of sensing information, obtain second sensing information related to the user's action, and perform a second function related to a first function, corresponding to the specific information and the second sensing information, based on the second sensing information being a second type of sensing information for performing the first function.

According to an embodiment, the specific information may be a level of interest in the user. The first type of sensing information may be sensing information related to the user's unintentional action. The second type of sensing information may be sensing information related to the user's intentional action.

According to an embodiment, the second function may be at least one of a plurality of functions including the first function or a modified function of the first function.

According to an embodiment, an increasing speed of a value of the specific information may be set to be varied more quickly than a decreasing speed. That is, the interest level may be set to have different sensitivity to increasing and decreasing sensor inputs values (e.g., approach velocity and separation velocity), respectively.

According to an embodiment, the value of the specific information may be set to decrease over time.

According to an embodiment, the instructions enable the processor to obtain the second sensing information based on a value of the specific information being higher than a threshold.

According to an embodiment, the instructions enable the processor to stop obtaining the second sensing information based on a value of the specific information being lower than a threshold.

According to an embodiment, the instructions enable the processor to obtain the first sensing information in an inactivated state, switch a state of the electronic device from the inactivated state to an activated state based on the specific information, and obtain the second sensing information in the activated state.

According to an embodiment, an electronic device may include a memory and a processor operatively connected with the memory. The memory may store instructions executed to enable the processor to obtain sensing information related to a user's action, determine specific information corresponding to the sensing information based on the sensing information being a first type of sensing information, perform a first function based on the specific information, and perform a second function corresponding to the sensing information based on the sensing information being a second type of sensing information.

According to an embodiment, the first function may be at least one of a function of switching a state of the electronic device from an inactivated state to an activated state, a function prior to the second function, a function of preparing for the second function, a function of waiting for the second function, or a function for representing a change in the specific information.

According to an embodiment, duration of the activated state may be determined based on the specific information.

According to an embodiment, an increasing speed of a value of the specific information may be set to be varied more quickly than a decreasing speed. That is, the interest level may be set to have different sensitivity to increasing and decreasing sensor inputs values (e.g., approach velocity and separation velocity), respectively.

According to an embodiment, a method of intelligent interaction of an electronic device includes obtaining first sensing information related to a user's action, determining specific information corresponding to the first sensing information based on the first sensing information being a first type of sensing information, obtaining second sensing information related to the user's action, performing a second function related to a first function, corresponding to the specific information and the second sensing information, based on the second sensing information being a second type of sensing information for performing the first function.

According to an embodiment, the specific information may be a level of interest in the user. The first type of sensing information may be sensing information related to the user's unintentional action. The second type of sensing information may be sensing information related to the user's intentional action.

According to an embodiment, the second function may be at least one of a plurality of functions including the first function or a modified function of the first function.

According to an embodiment, an increasing speed of a value of the specific information may be set to be varied more quickly than a decreasing speed. That is, the interest level may be set to have different sensitivity to increasing and decreasing sensor inputs values (e.g., approach velocity and separation velocity), respectively.

According to an embodiment, the value of the specific information may be set to decrease over time.

According to an embodiment, obtaining the second sensing information may include obtaining the second sensing information based on a value of the specific information being higher than a threshold.

According to an embodiment, obtaining the second sensing information may include stopping obtaining the second sensing information based on a value of the specific information being lower than a threshold.

According to an embodiment, the method may further include switching a state of the electronic device from an inactivated state to an activated state based on the specific information. The first sensing information may be obtained in the inactivated state, and the second sensing information may be obtained in the activated state.

FIG. 10 is a block diagram illustrating an electronic device 1001 in a network environment 1000 according to an embodiment. Referring to FIG. 10, the electronic device 1001 in the network environment 1000 may communicate with an electronic device 1002 via a first network 1098 (e.g., a short-range wireless communication network), or an electronic device 1004 or a server 1008 via a second network 1099 (e.g., a long-range wireless communication network). According to an embodiment, the electronic device 1001 may communicate with the electronic device 1004 via the server 1008. According to an embodiment, the electronic device 1001 may include a processor 1020, memory 1030, an input device 1050, a sound output device 1055, a display device 1060, an audio module 1070, a sensor module 1076, an interface 1077, a haptic module 1079, a camera module 1080, a power management module 1088, a battery 1089, a communication module 1090, a subscriber identification module (SIM) 1096, or an antenna module 1097. In some embodiments, at least one (e.g., the display device 1060 or the camera module 1080) of the components may be omitted from the electronic device 1001, or one or more other components may be added in the electronic device 101. In some embodiments, some of the components may be implemented as single integrated circuitry. For example, the sensor module 1076 (e.g., a fingerprint sensor, an iris sensor, or an illuminance sensor) may be implemented as embedded in the display device 1060 (e.g., a display).

The processor 1020 may execute, e.g., software (e.g., a program 1040) to control at least one other component (e.g., a hardware or software component) of the electronic device 1001 connected with the processor 1020 and may process or compute various data. According to an embodiment, as at least part of the data processing or computation, the processor 1020 may load a command or data received from another component (e.g., the sensor module 1076 or the communication module 1090) in volatile memory 1032, process the command or the data stored in the volatile memory 1032, and store resulting data in non-volatile memory 1034. According to an embodiment, the processor 1020 may include a main processor 1021 (e.g., a central processing unit (CPU) or an application processor (AP)), and an auxiliary processor 1023 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 1023 may be adapted to consume less power than the main processor 1021, or to be specific to a specific function. The auxiliary processor 1023 may be implemented as separate from, or as part of the main processor 1021.

The auxiliary processor 1023 may control at least some of functions or states related to at least one (e.g., the display device 1060, the sensor module 1076, or the communication module 1090) of the components of the electronic device 1001, instead of the main processor 1021 while the main processor 1021 is in an inactive (e.g., sleep) state or along with the main processor 1021 while the main processor 1021 is an active state (e.g., executing an application). According to an embodiment, the auxiliary processor 1023 (e.g., an image signal processor or a communication processor) may be implemented as part of another component (e.g., the camera module 1080 or the communication module 1090) functionally related to the auxiliary processor 123.

The memory 1030 may store various data used by at least one component (e.g., the processor 1020 or the sensor module 1076) of the electronic device 1001. The various data may include, for example, software (e.g., the program 1040) and input data or output data for a command related thereto. The memory 1030 may include the volatile memory 1032 or the non-volatile memory 1034.

The program 1040 may be stored in the memory 1030 as software, and may include, for example, an operating system (OS) 1042, middleware 1044, or an application 1046.

The input device 1050 may receive a command or data to be used by other component (e.g., the processor 1020) of the electronic device 1001, from the outside (e.g., a user) of the electronic device 1001. The input device 1050 may include, for example, a microphone, a mouse, a keyboard, or a digital pen (e.g., a stylus pen).

The sound output device 1055 may output sound signals to the outside of the electronic device 1001. The sound output device 1055 may include, for example, a speaker or a receiver. The speaker may be used for general purposes, such as playing multimedia or playing recordings, and the receiver may be used for an incoming calls. According to an embodiment, the receiver may be implemented as separate from, or as part of the speaker.

The display device 1060 may visually provide information to the outside (e.g., a user) of the electronic device 1001. The display device 1060 may include, for example, a display, a hologram device, or a projector and control circuitry to control a corresponding one of the display, hologram device, and projector. According to an embodiment, the display device 1060 may include touch circuitry adapted to detect a touch, or sensor circuitry (e.g., a pressure sensor) adapted to measure the intensity of force incurred by the touch.

The audio module 1070 may convert a sound into an electrical signal and vice versa. According to an embodiment, the audio module 1070 may obtain a sound through the input device 1050 or output a sound through the sound output device 1055 or an external electronic device (e.g., an electronic device 1002 (e.g., a speaker or a headphone)) directly or wirelessly connected with the electronic device 1001.

The sensor module 1076 may detect an operational state (e.g., power or temperature) of the electronic device 1001 or an environmental state (e.g., a state of a user) external to the electronic device 101, and then generate an electrical signal or data value corresponding to the detected state. According to an embodiment, the sensor module 1076 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1077 may support one or more specified protocols to be used for the electronic device 1001 to be coupled with the external electronic device (e.g., the electronic device 1002) directly (e.g., wiredly) or wirelessly. According to an embodiment, the interface 1077 may include, for example, a high definition multimedia interface (HDMI), a universal serial bus (USB) interface, a secure digital (SD) card interface, or an audio interface.

A connecting terminal 1078 may include a connector via which the electronic device 1001 may be physically connected with the external electronic device (e.g., the electronic device 1002). According to an embodiment, the connecting terminal 1078 may include, for example, a HDMI connector, a USB connector, a SD card connector, or an audio connector (e.g., a headphone connector).

The haptic module 1079 may convert an electrical signal into a mechanical stimulus (e.g., a vibration or motion) or electrical stimulus which may be recognized by a user via his or her tactile sensation or kinesthetic sensation. According to an embodiment, the haptic module 1079 may include, for example, a motor, a piezoelectric element, or an electric stimulator.

The camera module 1080 may capture a still image or moving images. According to an embodiment, the camera module 1080 may include one or more lenses, image sensors, image signal processors, or flashes.

The power management module 1088 may manage power supplied to the electronic device 1001. According to an embodiment, the power management module 388 may be implemented as at least part of, for example, a power management integrated circuit (PMIC).

The battery 1089 may supply power to at least one component of the electronic device 1001. According to an embodiment, the battery 1089 may include, for example, a primary cell which is not rechargeable, a secondary cell which is rechargeable, or a fuel cell.

The communication module 1090 may support establishing a direct (e.g., wired) communication channel or wireless communication channel between the electronic device 1001 and an external electronic device (e.g., the electronic device 1002, the electronic device 1004, or the server 1008) and performing communication through the established communication channel. The communication module 1090 may include one or more communication processors that are operable independently from the processor 1020 (e.g., the application processor (AP)) and support a direct (e.g., wired) communication or a wireless communication. According to an embodiment, the communication module 1090 may include a wireless communication module 1092 (e.g., a cellular communication module, a short-range wireless communication module, or a global navigation satellite system (GNSS) communication module) or a wired communication module 1094 (e.g., a local area network (LAN) communication module or a power line communication (PLC) module). A corresponding one of these communication modules may communicate with the external electronic device via the first network 1098 (e.g., a short-range communication network, such as Bluetooth™, wireless-fidelity (Wi-Fi) direct, or infrared data association (IrDA)) or the second network 1099 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1092 may identify and authenticate the electronic device 1001 in a communication network, such as the first network 1098 or the second network 1099, using subscriber information (e.g., international mobile subscriber identity (IMSI)) stored in the subscriber identification module 1096.

The antenna module 1097 may transmit or receive a signal or power to or from the outside (e.g., the external electronic device) of the electronic device 101. According to an embodiment, the antenna module may include one antenna including a radiator formed of a conductor or conductive pattern formed on a substrate (e.g., a printed circuit board (PCB)). According to an embodiment, the antenna module 1097 may include a plurality of antennas. In this case, at least one antenna appropriate for a communication scheme used in a communication network, such as the first network 1098 or the second network 1099, may be selected from the plurality of antennas by, e.g., the communication module 1090. The signal or the power may then be transmitted or received between the communication module 1090 and the external electronic device via the selected at least one antenna. According to an embodiment, other parts (e.g., radio frequency integrated circuit (RFIC)) than the radiator may be further formed as part of the antenna module 1097.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1001 and the external electronic device 1004 via the server 1008 coupled with the second network 1099. The first and second external electronic devices 1002 and 1004 each may be a device of the same or a different type from the electronic device 1001. According to an embodiment, all or some of operations to be executed at the electronic device 1001 may be executed at one or more of the external electronic devices 1002, 1004, or 1008. For example, if the electronic device 1001 should perform a function or a service automatically, or in response to a request from a user or another device, the electronic device 1001, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1001. The electronic device 1001 may provide the outcome, with or without further processing of the outcome, as at least part of a reply to the request. To that end, a cloud computing, distributed computing, or client-server computing technique may be used, for example.

The electronic device according to certain embodiments may be one of various types of electronic devices. The electronic devices may include, e.g., a portable communication device (e.g., a smartphone), a computer device, a portable multimedia device, a portable medical device, a camera, a wearable device, or a home appliance. According to an embodiment of the disclosure, the electronic device is not limited to the above-listed embodiments.

It should be appreciated that certain embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware and may interchangeably be used with other terms, for example, "logic," "logic block," "part," or "circuitry". A module may be a single integral component, or a minimum unit or part thereof, adapted to perform one or more functions. For example, according to an embodiment, a module may be implemented in the form of an application-specific integrated circuit (ASIC).

Certain embodiments as set forth herein may be implemented as software (e.g., the program 1040) including one or more instructions that are stored in a storage medium (e.g., internal memory 1036 or external memory 1038) that is readable by a machine (e.g., the electronic device 1001). For example, a processor (e.g., the processor 1020) of the machine (e.g., the electronic device 1001) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

As is apparent from the foregoing description, according to certain embodiments, a diversity of function representations may be secured using a tiny difference in the user's action.

According to certain embodiments, various functions may be performed using a tiny difference in the user's action.

According to certain embodiments, the accuracy of recognizing the user's action and grasping the user's intent may be enhanced using a tiny difference in the user's action.

According to certain embodiments, a customized function suited for the user's context may be performed using a tiny difference in the user's action.

According to certain embodiments, there is no need for the user to learn correct actions (e.g., wake-up words or gestures), thus enhancing user convenience.

While the disclosure has been shown and described with reference to certain example embodiments thereof, it will be understood by those skilled in the art that various changes in form and details may be made therein without departing from the disclosure as defined by the appended claims and their equivalents.

What is claimed is:

1. An electronic device, comprising:
   a memory;
   one or more sensors; and
   a processor operatively connected with the memory and the one or more sensors, wherein the memory stores instructions executable by the processor to cause the electronic device to:
   detect, by the one or more sensors, first sensing information related to a user action of a user, based on the first sensing information being a first type of sensing information, determine specific information corresponding to the first sensing information, identify whether a value of the specific information is greater than a threshold, based on identifying that the value of the specific information is greater than the threshold, detect, by the one or more sensors, second sensing information related to the user action, and based on the second sensing information being a second type of sensing information, execute a second function related to a first function, the second function corresponding to the value of the specific information and the second sensing information, wherein based on the first sensing information satisfying a condition, the value of the specific information is configured to increase at a first rate, wherein based on the first sensing information not satisfying the condition, the value of the specific information is configured to decrease at a second rate, and wherein the first rate is greater than the second rate.

2. The electronic device of claim 1, wherein the specific information includes an interest level for controlling sensitivity of the electronic device to inputs detected by the one or more sensors, wherein the second type of sensing information indicates intentional actions prestored by the electronic device, each associated with an executable function, and wherein the first type of sensing information indicates unintentional actions that are not prestored by the electronic device.

3. The electronic device of claim 2, wherein the interest level is determined based on the first sensing information.

4. The electronic device of claim 2, wherein the interest level is configured to decrease over time in absence of sensor inputs that increase the interest level.

5. The electronic device of claim 1, wherein the second function includes at least one of a plurality of functions including the first function, or a modified function for the first function.

6. The electronic device of claim 1, wherein the detecting of the second sensing information is terminated based on the value of the specific information being lower than the threshold.

7. The electronic device of claim 1, wherein the first sensing information is detected while the electronic device operates in an inactivated state, and the instructions are further executable by the processor to cause the electronic device to:

terminate the inactivated state and operate in an activated state based on the specific information, wherein the second sensing information is detected while the electronic device operates in the activated state.

8. An electronic device, comprising:

a memory;

one or more sensors; and a processor operatively connected with the memory and the one or more sensors, wherein the memory stores instructions executable by the processor to cause the electronic device to:

detect, by the one or more sensors, sensing information related to a user action of a user, based on the sensing information being a first type of sensing information, determine specific information corresponding to the detected sensing information, identify whether a value of the specific information is greater than a threshold, and based on identifying that the value of the specific information is greater than the threshold, execute a first function based on the value of the specific information, and based on the sensing information being a second type of sensing information, execute a second function corresponding to the sensing information, wherein based on the first sensing information satisfying a condition, the value of the specific information is configured to increase at a first rate, wherein based on the first sensing information not satisfying the condition, the value of the specific information is configured to decrease at a second rate, and wherein the first rate is greater than the second rate.

9. The electronic device of claim 8, wherein the first function includes at least one of:

switching a state of the electronic device from an inactivated state to an activated state;

a function executed prior to execution of the second function;

a function executed in preparation to execute the second function;

an waiting state waiting for execution of the second function; and a notification function generating an output indicating a change in the specific information.

10. The electronic device of claim 9, wherein a time for which the activated state is to be maintained is determined based on the specific information.

11. The electronic device of claim 9, wherein the specific information includes an interest level for controlling sensitivity of the electronic device to inputs detected by the one or more sensors, wherein the detected sensing information includes a velocity of a user moving, and the interest level is variable based on the sensing information, and wherein a first rate of the interest level increasing is greater than a second rate of the interest level decreasing.

12. A method in an electronic device, comprising:

detecting, by one or more sensors of the electronic device, first sensing information related to a user action of a user;

based on the first sensing information being a first type of sensing information, determining, by at least one processor of the electronic device, specific information;

identifying whether a value of the specific information is greater than a threshold;

based on identifying that the value of the specific information is greater than the threshold, detecting, by the one or more sensors, second sensing information related to the user action; and based on the second sensing information being a second type of sensing information, executing a second function related to a first function, the second function corresponding to the value of the specific information and the second sensing information, wherein based on the first sensing information satisfying a condition, the value of the specific information is configured to increase at a first rate, wherein based on the first sensing information not satisfying the condition, the value of the specific information is configured to decrease at a second rate, and wherein the first rate is greater than the second rate.

13. The method of claim 12, wherein the specific information includes an interest level for controlling sensitivity of the electronic device to inputs detected by the one or more sensors,
   wherein the second type of sensing information indicates intentional actions prestored by the electronic device, each associated with an executable function, and
   wherein the first type of sensing information indicates unintentional actions that are not prestored by the electronic device.

14. The method of claim 13, wherein the interest level is variable based on the first sensing information.

15. The method of claim 13, wherein the interest level is configured to decrease over time in absence of sensor inputs that increase the interest level.

16. The method of claim 12, wherein the second function is includes at least one of a plurality of functions including the first function, or a modified function for the first function.

17. The method of claim 12, wherein the detecting of the second sensing information is terminated based on a value of the specific information being lower than the threshold.

18. The method of claim 12, wherein the first sensing information is detected while the electronic device operates in an inactivated state, and the method further comprises:
   terminating the inactivated state and operating in an activated state based on the specific information, wherein the second sensing information is detected while the electronic device operates in the activated state.

* * * * *